(12) United States Patent
Salazar

(10) Patent No.: US 7,963,373 B2
(45) Date of Patent: Jun. 21, 2011

(54) BRAKE STROKE INDICATOR

(76) Inventor: Joe Martin Salazar, Lufkin, TX (US)

( * ) Notice: Subject to any disclaimer, the term of this patent is extended or adjusted under 35 U.S.C. 154(b) by 894 days.

(21) Appl. No.: 11/655,339

(22) Filed: Jan. 19, 2007

(65) Prior Publication Data

US 2007/0205060 A1    Sep. 6, 2007

Related U.S. Application Data

(60) Provisional application No. 60/777,684, filed on Mar. 1, 2006.

(51) Int. Cl.
*F16D 66/02* (2006.01)

(52) U.S. Cl. .............................. 188/1.11 W; 188/1.11 R

(58) Field of Classification Search ............ 188/1.11 W, 188/1.11 R, 72.9, 1.11 E, 196 R, 79.55; 116/208, 116/283

See application file for complete search history.

(56) References Cited

U.S. PATENT DOCUMENTS

| | | | | |
|---|---|---|---|---|
| 5,044,302 A * | 9/1991 | Goldfein et al. | ............... | 116/208 |
| 5,140,932 A * | 8/1992 | Goldfein et al. | ............... | 116/208 |
| 5,226,509 A * | 7/1993 | Smith | ..................... | 188/1.11 W |
| 5,320,198 A | 6/1994 | Hoyt et al. | | |
| 5,358,076 A | 10/1994 | Lucas | | |
| 5,649,469 A | 7/1997 | Pierce | | |
| 5,653,313 A * | 8/1997 | Somerfield et al. | ...... | 188/1.11 W |
| 5,699,880 A * | 12/1997 | Hockley | ................. | 188/1.11 W |
| 5,762,165 A | 6/1998 | Crewson | | |
| 5,913,385 A | 6/1999 | Thibodeau | | |
| 6,059,074 A * | 5/2000 | Crewson | ................. | 188/1.11 W |
| 6,135,242 A | 10/2000 | Hockley | | |
| 6,237,723 B1 * | 5/2001 | Salsman | ................. | 188/1.11 W |
| 7,222,699 B2 * | 5/2007 | Salazar | ................... | 188/1.11 W |

* cited by examiner

*Primary Examiner* — Robert Siconolfi
*Assistant Examiner* — Stephen Bowes
(74) *Attorney, Agent, or Firm* — Edwin Tarver; Lauson & Tarver LLP

(57) ABSTRACT

A brake stroke indicator, comprising a L shaped indicator member disposed on the push rod clevis pin, and a concealing means. The indicator member comprises a first section with holes to connect with the push rod clevis pin and slack adjuster, and a second section of highly reflective color surface angularly disposed to the first section. The indicator member moves with the clevis pin, and oscillates as the push rod is reciprocating. The indicator member hides behind the concealing member while the push rod reciprocates within safe limits. The second section of indicator show up out of the concealing means when the push rod goes beyond its safe operational limits.

11 Claims, 4 Drawing Sheets

BRAKE STROKE INDICATOR

CROSS-REFERENCE TO RELATED APPLICATION:

This application claims the priority date of provisional application 60/777,684 filed on Mar. 1, 2006.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates in general to vehicular braking systems, and more particularly to a brake stroke indicator, which visually warns drivers of faulty brake operation.

Faulty vehicle braking systems can cause serious accidents. One factor contributing to faulty brakes is the wear of brake parts, which increases the amount of effort required by an operator to effectively brake. If brake wear is extreme, it may result in complete loss of braking power. To determine whether a braking system is working properly and whether wear is within limit, brake stroke indicators are used to indicate the stroke of the brake push rod.

Several types of brake stroke indicating systems have been developed in art. U.S. Pat. No. 5,913,385 to Thibodeau discloses a visual brake stroke indicator for determining brake stroke condition on a vehicle braking system. The indicator comprises a bracket having an elongated member having at one end an attachment portion located generally at a right angle radius to the elongated member, a continuous slot extending along the length of the elongated member, and a second bracket detachably mounted to the continuous slot along the elongated member. The bracket is mounted to a chamber mounting bracket which supports a brake chamber having a clevis assembly connected to a brake arm. The elongated member runs parallel to the clevis assembly. The second bracket has a base and two extending members from the base.

U.S. Pat. No. 5,358,076 to Lucas discloses an indicator unit for a vehicle air brake system which includes a brake rod mounted for movement between a non-braking first position and a predetermined safe maximum braking second position. A pivotally mounted slack adjuster is connected to the brake rod and is responsive to the movement of the rod. An indicator unit is provided which has a first section mounted on the connection between the rod and adjuster, a second section retained in a predetermined alignment with the rod, and a third section angularly disposed relative to the second section. The unit third section is provided with angularly disposed, exposed, first and second reference marks. When the rod is in the first position, the first reference mark is aligned with a predetermined first segment of the adjuster. When the rod is in the second position, the second reference mark is aligned with the predetermined segment of the adjuster. The alignment of the second reference mark with the adjuster segment is indicative that the rod has traversed 80%, or the limit, of its safe braking stroke and thus indicates adjustment of the brake system is warranted.

U.S. Pat. No. 5,320,198 to Hoyt disclose an air brake stroke length adjustment gauge for indicating the setting and linear stroke movement of a brake rod of a brake assembly. Reference indicators are provided on both the brake-rod's clevis and on the arm of the brake's slack adjuster member. The indicators cooperate, by their relative movement, showing brake rod travel and adjustment as a visual indication by the relative movement by the reference indicator of the linearly-moving clevis with respect to the angular rotation of the reference indicator on the rotating-slack adjuster arm.

However, the installing location, structure and over-stroke indicating means of the brake stroke indicator of the present invention are different. Moreover, the brake stroke indicator of the present invention is completely concealed and can only be seen in case of an over-stroke or out of adjustment condition. This and other features of the present invention will become better understood with reference to the appended Summary, Description, and Claims.

SUMMARY

The present invention is a brake stroke indicator which visually indicates the over stroke and out of adjustment of the push rod. The indicator comprises a L shaped indicator member which is connected to the push rod clevis pin and the slack adjuster, and a concealing means for concealing the indicator member when the push rod stroke is within safe operational limit. The L shaped member includes a first section with holes for mounting it on the clevis pin and a second section disposed at an angle substantially 90 degrees with the first section. The indicator member moves with the clevis pin and oscillates as the push rod is reciprocating. The second section of the indicator having a highly reflective color surface, shows up out of the concealing means when the push rod moves beyond its safe operational limits.

FIGURES—REFERENCE NUMERALS

Figure 1:
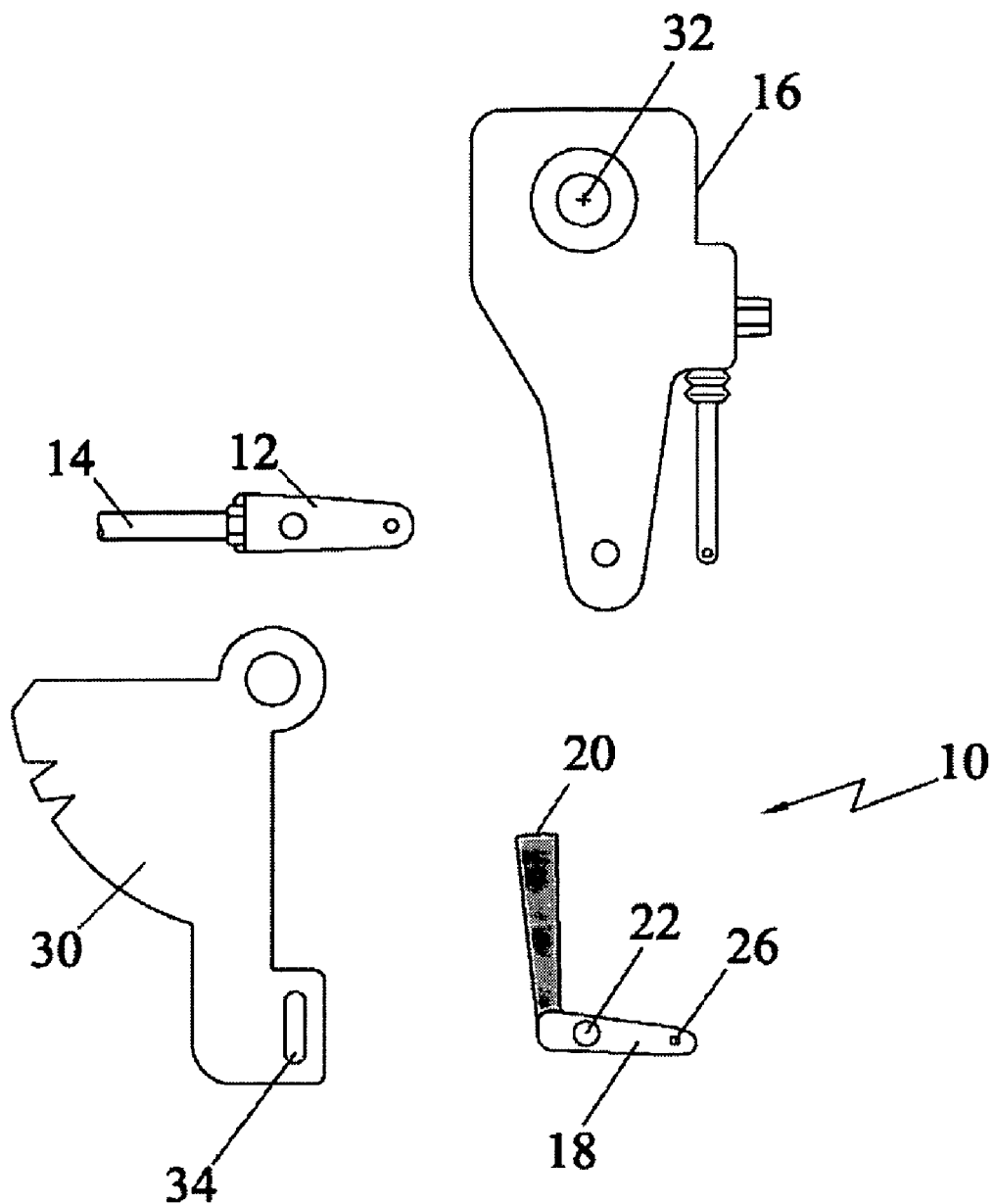
FIG. 1 is an unassembled view of the brake stroke indicator in accordance with the present invention.

10 . . . Brake Stroke Indicator
12 . . . Clevis Pin
14 . . . Push Rod
16 . . . Slack Adjuster
18 . . . First Section of Brake Stroke Indicator
20 . . . Second Section of Brake Stroke Indicator
22 . . . First Hole of Brake Stroke Indicator
24 . . . First Connection of Clevis Pin and Slack Adjuster
26 . . . Second Hole of Brake Stroke Indicator 28 ... Second Connection of Clevis Pin and Slack Adjuster
30 ... Concealing Portion
32 ... Centre of Oscillation of Slack Adjuster
34 ... Slot on Concealing Portion
100 ... Second Embodiment of Brake Stroke Indicator
120 ... First Section of Second Embodiment of Brake Stroke Indicator
140 ... Hole on Second Embodiment of Brake Stroke Indicator
160 ... Gripping Portion on Second Embodiment of Brake Stroke Indicator

DETAILED DESCRIPTION

Referring to the drawings, a preferred embodiment of the brake stroke indicator 10 is illustrated and generally indicated as 10 in FIGS. 1 through 4. The brake stroke indicator 10 is mounted on the push rod clevis pin 12 and visually indicates when the push rod 14 moves beyond its operational limits.

Referring to FIGS. 1 through 4, the indicator comprises a L shaped indicator 10 which is connected to the push rod clevis pin 12 and slack adjuster 16 assembly. The indicator includes two sections, first section 18 which is used to mount it on the clevis pin 12 and a second section 20 disposed at an angle substantially 90 degrees with the first section. The second section 20 has a highly reflective color surface.

The first section 18 includes two holes, first hole 22 is used to make a first connection 24 with the clevis pin 12 and slack adjuster 16 assembly and, the second hole 26 to establish a second connection 28 with the automatic slack adjuster 16. As the push rod reciprocates the indicator 10 travels with the clevis pin 12. The second connection 28 with the slack adjuster is movable perpendicular to the push rod 14 motion. When the indicator 10 moves with the push rod 14, the second connection 28 with the slack adjuster prevents the indicator 10 to move in the direction of push rod and tilts the indicator 10, thereby facilitating the indicator to oscillate, while the push rod 14 is reciprocating.

Figure 2:
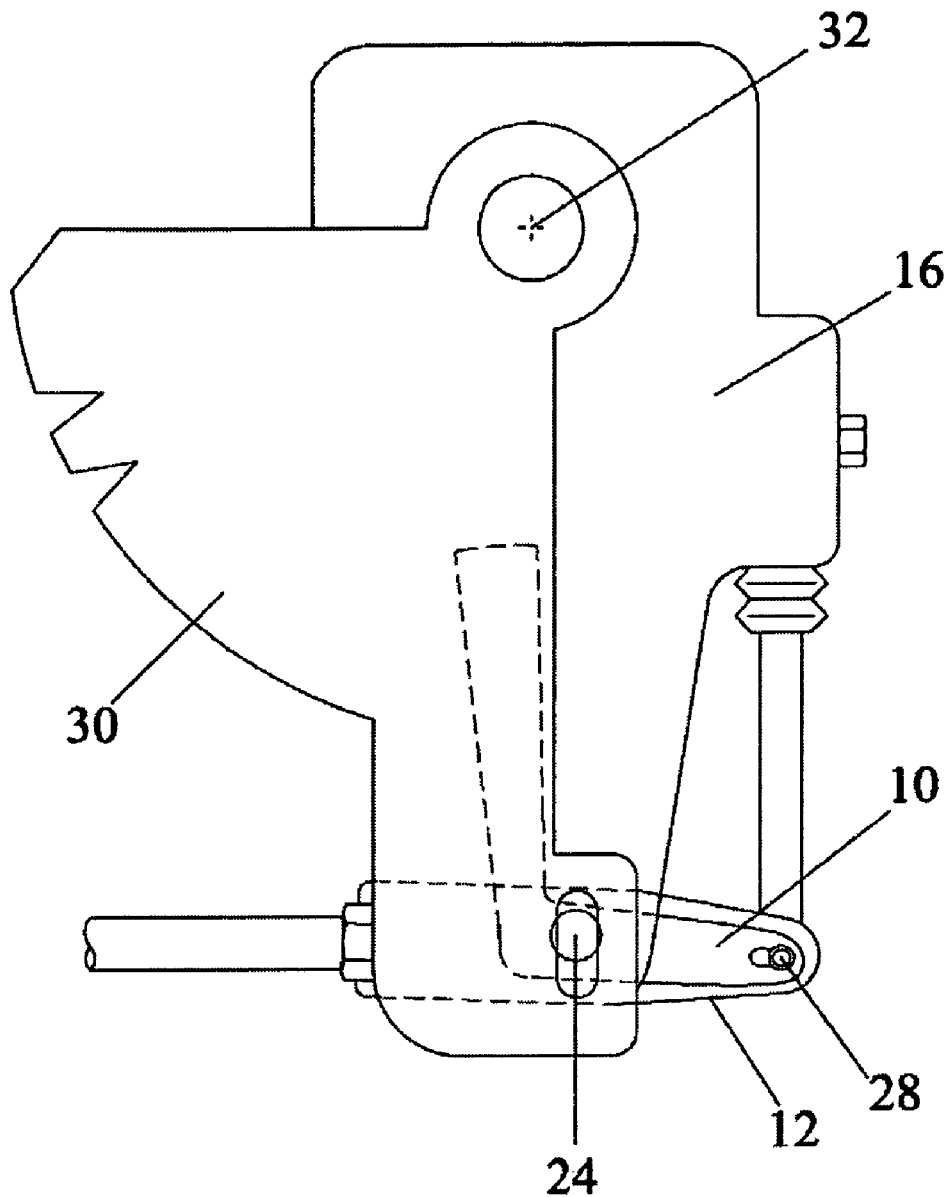
FIG. 2 is the assembled view of the brake stroke indicator showing the indicator behind the concealing means, when the push rod reciprocates within safe limits.
Figure 3:
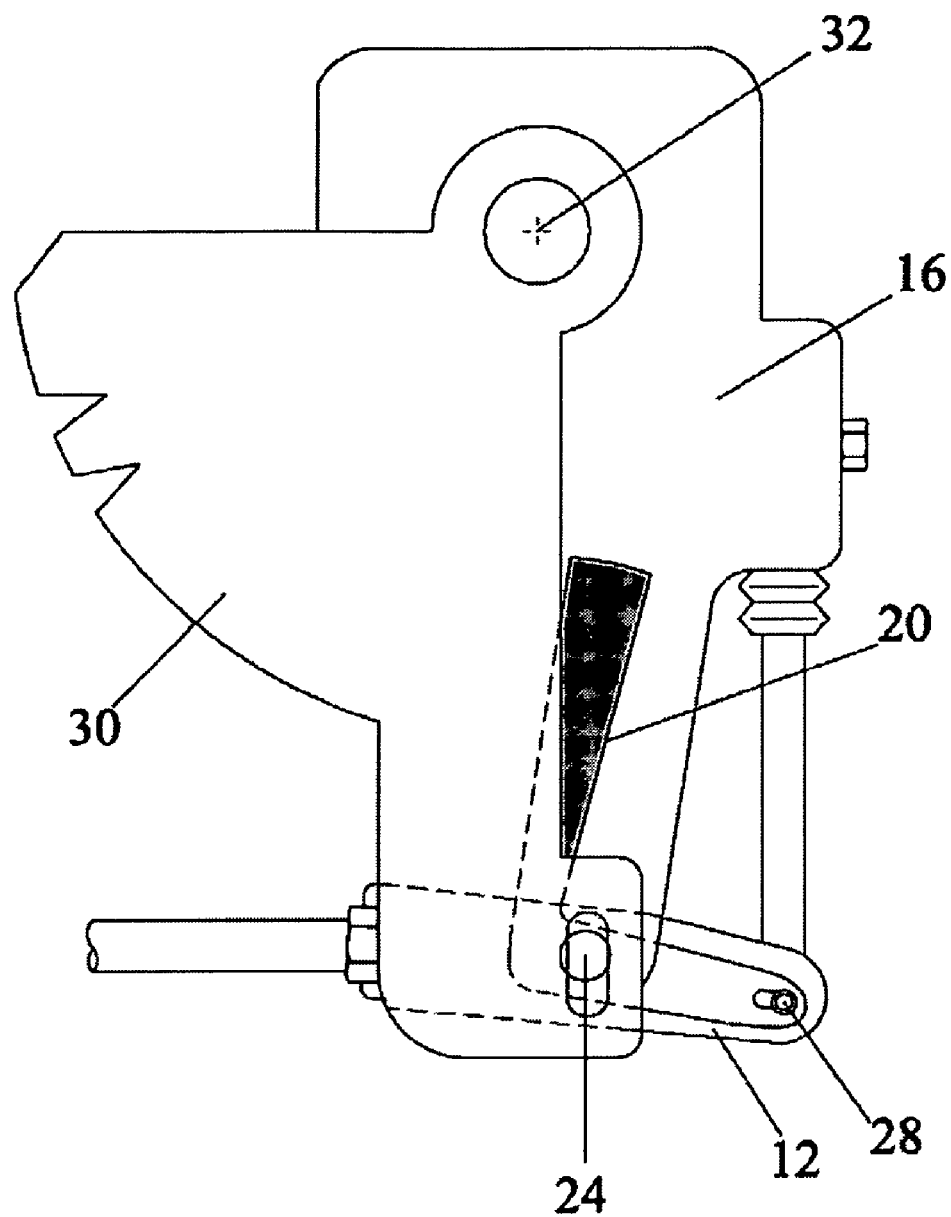
FIG. 3 is the assembled view of the brake stroke indicator, showing the indicator out of the concealing portion, when the push rod is over stroked or out of adjustment.

Referring to FIGS. 1 through 3, the concealing portion 30 is a plate disposed between the first connection 24 of the push rod clevis pin and the indicator, and the centre of oscillation 32 of the slack adjuster. The plate has a slot 34 for connecting it on the first connection 24 of the push rod clevis pin 12 and the indicator 10. The shape of the plate is such that it conceals the indicator member 10 when the push rod is operating within safe operational limits. The second section 20 of the indicator member shows up out of the concealing portion 30 when the push rod moves beyond the specified safe maximum braking position or is out of adjustment.

Figure 4:
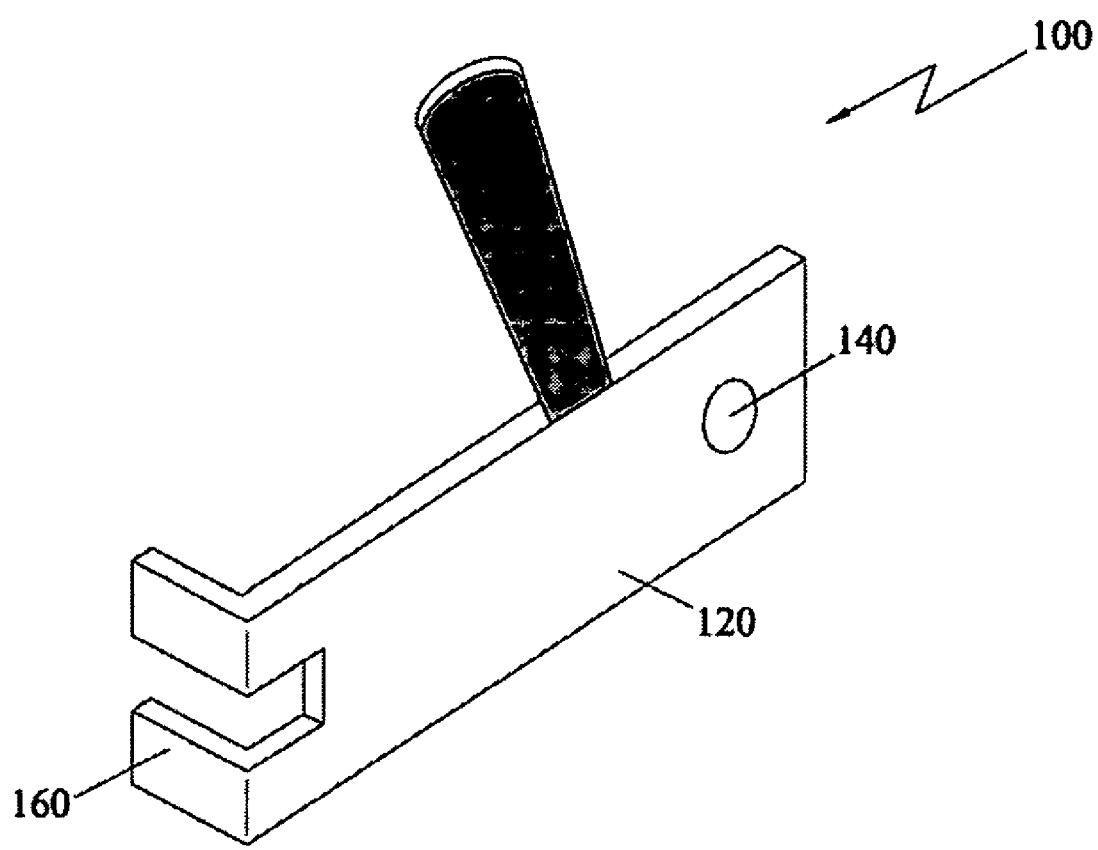
FIG. 4 is a perspective view of another embodiment of the brake stroke indicator member.

Referring to FIG. 4, in another embodiment of the present invention 100 which is especially meant for use with manual slack adjusters, the first section 120 of the indicator has one hole 140 to connect with the slack adjuster and a gripping portion 160 for mounting the indicator 100 on the clevis pin 12. The gripping portion is perpendicular to the first section 120, which has a open slot which will fit on the clevis pin. The second section is similar to the second section 20 of the previous embodiment. The location of mounting and the operation of the present embodiment 100 is same as that of the previous embodiment 10.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A brake stroke indicator comprising:
   a. an indicator member disposed on a push rod clevis pin, between an automatic slack adjuster attached to a concealing plate, wherein the indicator member moves in tandem with the push rod clevis pin as a push rod reciprocates; and
   b. wherein the concealing plate is attached to the push rod clevis pin, an oscillation center of the automatic slack adjuster, and is oriented for concealing the indicator member such that the indicator member extends into view from behind the concealing plate when the push rod moves beyond its specified safe operational limit.

2. The indicator of claim 1, wherein the indicator member is connected to the push rod clevis pin and a slack adjuster assembly.

3. The indicator of claim 2, where in the indicator member oscillates with the push rod clevis as the push rod reciprocates.

4. The indicator of claim 1, wherein the specified safe operational limit of the push rod is a predetermined safe maximum braking position.

5. The indicator of claim 1, wherein the indicator member comprises a first section mounted on the push rod clevis pin and a second section, disposed at approximately a ninety degree angle relative to the first section.

6. The indicator of claim 5, wherein the first section of the indicator member comprises at least one hole for connecting it to the push rod clevis pin.

7. The indicator of claim 6, wherein the first section comprises two holes for connecting the indicator with the clevis pin and slack adjuster 8. The indicator of claim 5 wherein the second section of the indicator member has a highly reflective surface color.

9. The indicator of claim 8, wherein the second section of the indicator member emerges from the concealing means and visually indicates abnormal functioning of the pushrod when the pushrod moves beyond its specified safe operational limit.

10. The indicator of claim 1, wherein the indicator member is an L shape member.

11. The indicator of claim 1, wherein the concealing means comprises at least one plate disposed between the push rod clevis pin and the center of the brake shaft on the slack adjuster, thereby concealing the indicator member during normal operation of the brake stroke indicator.

* * * * *